United States Patent Office 2,936,554
Patented May 17, 1960

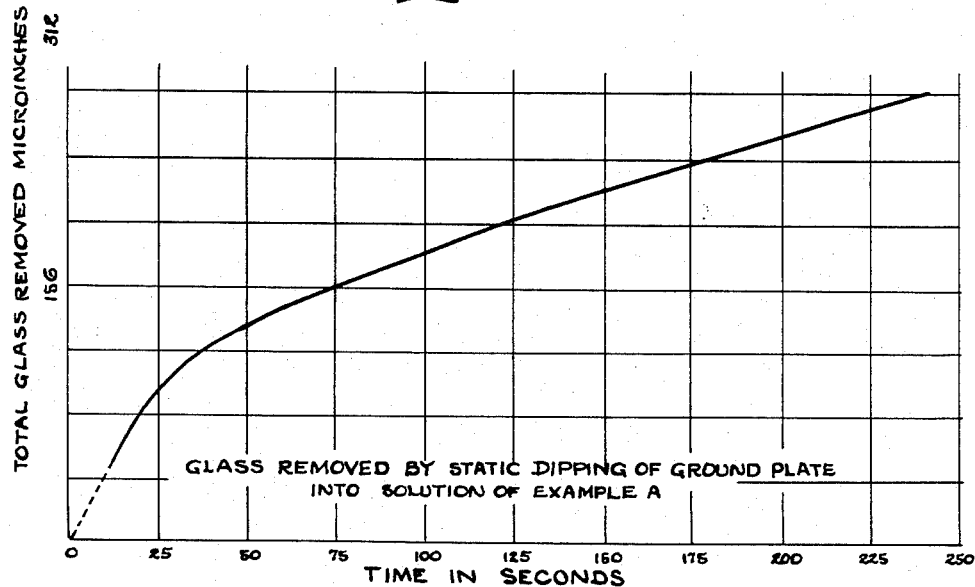
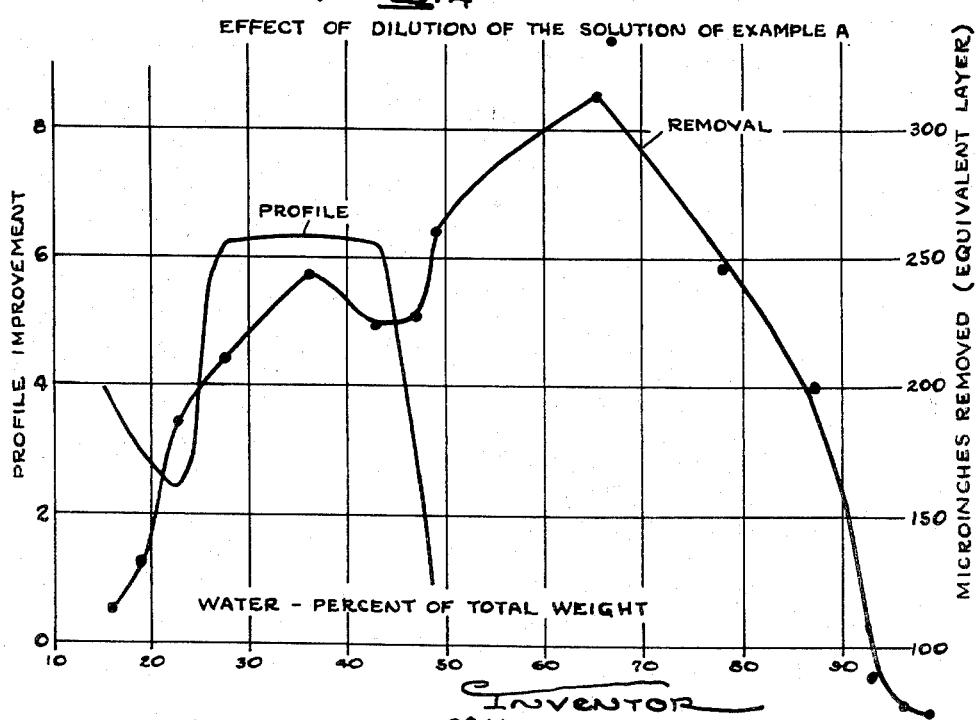

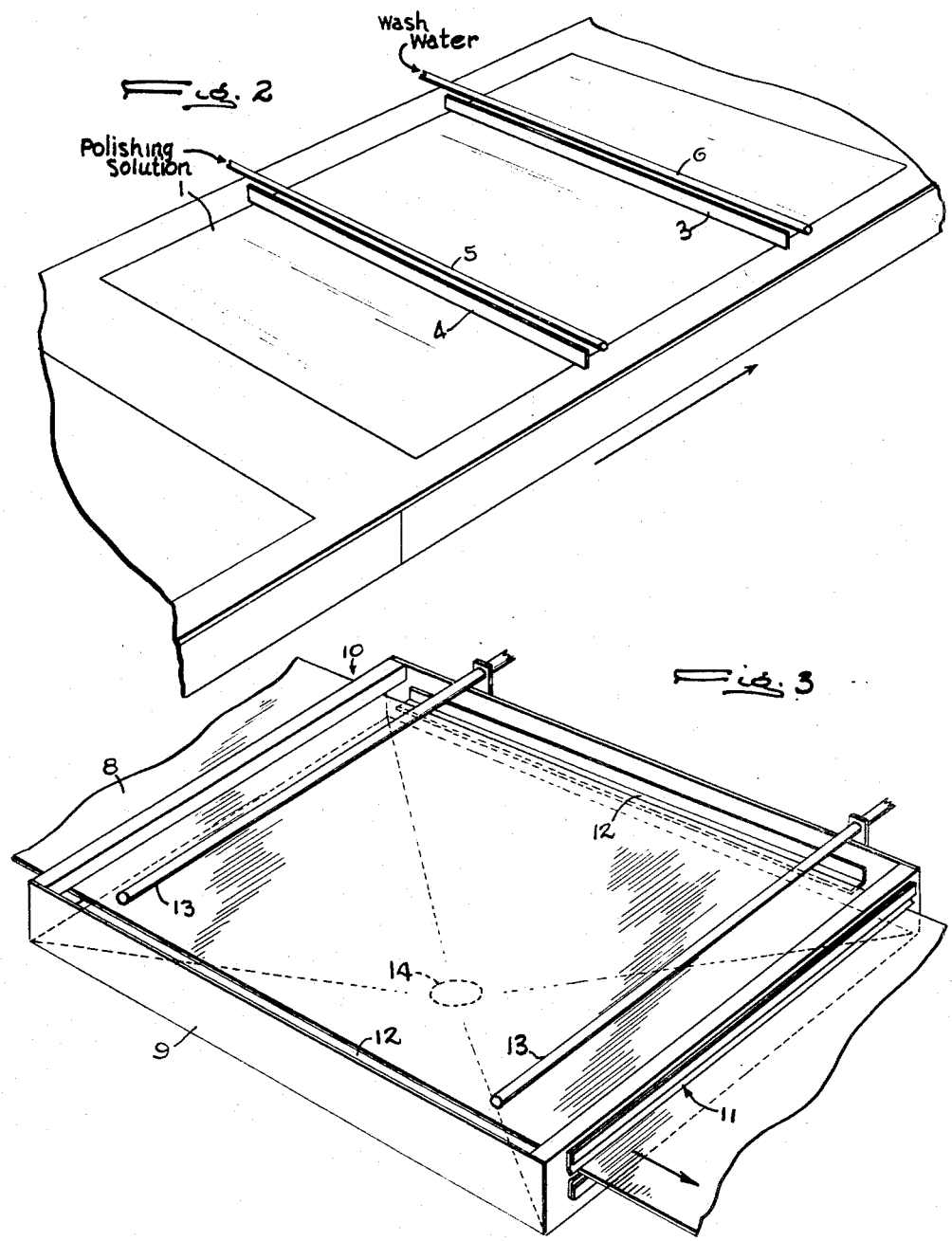

2,936,554

PREPOLISHING PLATE GLASS

Albert E. Junge, New Kensington, Pa., assignor to Pittsburgh Plate Glass Company, Allegheny County, Pa., a corporation of Pennsylvania Application November 12, 1958, Serial No. 773,353

12 Claims. (Cl. 51—283)

This invention relates to what may be aptly termed "prepolishing" of ground plate glass. By that is meant a clearing of the ground glass or "smooth" prior to its actual polishing and in order to reduce the amount of actual polishing required.

Economic plate glass manufacture is substantially confined to large-scale continuous formation of a lime-soda-sand glass ribbon. The upper and lower glass surfaces must be ground to precise parallelism and subsequently polished to render the glass completely transparent.

In the glass production line, whether the glass is carried by cars as cut lengths for single side finishing, or conveyed as an uncut ribbon for twin finishing, the glass moves forward at a continuous rate, usually from 100 to 200 inches per minute under single side runners or between the twin runners of the successive grinding and polishing stations. The length of the line usually needs run into hundreds of feet at a time to avoid dangerously overheating the worked areas.

While the crushing action of the grinding abrasives affords a relatively fast glass removal, the polishing operation has remained one in which a great amount of mechanical work is expended on the glass surface to remove a minute amount of glass. The polishing action, typically by an abrasive action of finely divided rouge particles, has required a polishing line length and time duration all out of proportion to the amount of glass removed. For example, the removal by polishing may be as little as one percent of the grinding removal with a polishing line of greater length than the grinding line.

It has heretofore been proposed in U.S. Patent No. 2,372,536 to prepolish or clear ground glass articles by subjecting them to an attack of a mixture of acid, specifically hydrofluoric and sulfuric. The presently disclosed method is one which brings about an improved prepolishing or clearing which is especially suited to the continuous manufacture of plate glass.

It is a principal object of this present invention to prepolish by chemical action the ground surface of plate glass in the course of its manufacture so that it may be more quickly and more easily polished to the ultimate finish required. It is an advantage of the process that it requires relatively low capital investment and can be readily employed in existing plate glass plants. Thus, for a given polishing and grinding line, the line speed can be increased when prepolishing is provided without an accompanying setback in the quality of finish. Conversely, the same grinding and polishing equipment may be used to obtain a generally higher grade polish when prepolishing is employed in accordance with the invention.

Various further objects and advantages of the invention will become apparent in the following description of the invention in acompaniment with the drawings in which:

Figure 1 shows the relationship between amounts of glass removed and contact time with a preferred solution;

Fig. 2 is a perspective view of a single-side prepolishing apparatus;

Fig. 3 is a perspective view of a twin prepolishing apparatus; and

Fig. 4 illustrates the effect of dilution of the preferred solution.

The method described and the chemical compositions involved are directed to commercial plate glass polishing in which speed, reliability, and economy in continuous high production plate glass manufacturing are primary prerequisites. It will be apparent to those skilled in the art that variations can and shall be made to meet various conditions, and pains are taken to describe particular steps and conditions surrounding their successful employment to provide a guide for such variations as may be sought. It will be appreciated, of course, that the intention here is to cover and secure all modifications, alternative constructions and equivalents within the spirit and scope of the invention as expressed in the appended claims.

THE GENERAL METHOD

Briefly, in accordance with my invention, a ground plate glass surface is flooded with a glass attacking aqueous solution consisting essentially of hydrofluoric acid and ammonium bifluoride. After the attack has proceeded for a time to substantially clear the opaque ground surface without also drilling the undersurface, the solution and reaction products are removed and the glass is washed. The glass thus usefully prepolished is then polished to its ultimate finish as plate glass by finely divided abrasives under resilient runner faces, either with or without further chemical assistance. In the practice of the invention it is important to appreciate that physical, as well as chemical, aspects of the glass and the reaction involved are important and must be controlled within significant limits if the glass surfaces are to be improved rather than ruined. The process thus generally and briefly set forth is accordingly detailed in the following paragraphs and the descriptive terms are defined.

THE GROUND GLASS SURFACE

Looking first to the kind of surface which is usefully prepolished, all references to plate glass herein are to lime-soda-sand glass, which, in terms of the ratio of the amounts of its principal ingredients, is here substantially 1.13 parts of CaO and MgO to 1.0 parts $Na_2O$ to 5.4 parts $SiO_2$. In the lime constituent of the glass, the magnesium oxide may be considered as replacing part of the calcium oxide. A typical composition for the glass used in tests reported here is:

| | |
|---|---|
| $SiO_2$ | 71.6 |
| $Na_2O$ | 13.2 |
| $CaO$ | 11.7 |
| $MgO$ | 2.5 |
| $Na_2SO_4$ | .6 |
| $NaCl$ | .1 |
| $Al_2O_3$ | .2 |
| $Fe_2O_3$ | .12 |

Slight variations of these percentages are not known to have any effect on the procedure here described, and the glass composition is believed to be generally representative of plate glass as made today.

A useful definition of the ground glass surface is descriptive of the process by which it is made—namely, by a fracturing or crushing action of successively finer grades of sand under rotary iron block runners. The surface herein presented for prepolishing is a very smooth ground surface. Fissures are believed to exist which may contribute to the formation of new pits during polishing by the further spalling out of glass partially fractured during grinding. The fineness of the last stage abrasive affords one measure of describing at least the apparent smoothness of the ground surface and the likely polishing requirements. In the examples for the process here described the ground glass presented for polishing as a "commercial smooth" was finish ground with garnet particles, the last stage particles ranging up to about 20 microns in diameter.

The surface, while it transmits light, is opaque in that it is not transparent, and has a whitish color due to light scattering by the many facets of the ground surface. While such a surface appears of uniform texture, polishing to the pit bottoms does not result in their simultaneous disappearance, and most of the polishing effort is expended on glass already substantially planed.

As a guide for measuring the likely significant pit depth in such a "commercial smooth," a small glass sample of about four square inches is rouge polished until no more than one pit per square inch is detected by edgelight observation and confirmed as pits by microscopic examination. Dividing the weight of glass so removed for a given area by the density (which is 41.30 grams per cubic inch for the specific glass described) yields an equivalent solid layer measurement of 350 to 600 micro inches. While the rough surface of the ground glass indicates that a compensating factor might be employed to give a more realistic figure than the equivalent solid layer, any such compensation would probably be quite small since most of the polishing action in producing the ultimate polish lies in further planing of an already planed surface to reach most of the deeper pits or fissure bottoms.

A PREFERRED SOLUTION

While compounds containing hydrofluoric acid are notoriously bad actors in the presence of polished plate glass, the following solution itself capable of ruining polished surfaces, clears the ground surface described and lessens the polishing requirements when used according to the process conditions prescribed by the invention. The manner in which its formulation particularly accommodates practical realities will be appreciated as the description proceeds.

The preferred example of a glass-attacking solution, here termed Example A, is 60% ammonium bifluoride in 60% aqueous hydrofluoric acid solution. This composition may also be expressed in parts by weight:

| | |
|---|---|
| $H_2O$ | 100 parts (16%) |
| HF | 150 parts (24%) |
| $NH_4FHF$ | 375 parts (60%) |

The saturation temperature for the bifluoride of Example A is in the vicinity of 80 to 90° F. and for that reason should not be cooled below that temperature during the prepolishing lest crystals precipitate on the glass and cause a frosted or other undesired pattern effect. This is readily done by heating the solution and the glass to the vicinity of 100° F.

The solution is an obviously toxic one, and the fumes can also seriously damage already polished glass surfaces. Containers should be corrosion resistant (polyethylene is convenient) and fumes should be exhausted from the area. For safety, a colorant may be added to this otherwise colorless solution, a blue ink dye having been found acceptable for this purpose.

The chemical attack of the glass by the solution is believed to follow these equations for the major components:

$$2NH_4HF_2 + 2HF + SiO_2 \rightarrow (NH_4)_2SiF_6 + 2H_2O \quad (1)$$
$$2HF + CaO \rightarrow CaF_2 + H_2O \quad (2)$$
$$4HF + Na_2O \rightarrow 2NaFHF + H_2O \quad (3)$$
$$2HF + MgO \rightarrow MgF_2 + H_2O \quad (4)$$

When a piece of ground glass is dipped into a container of the solution of Example A and left immersed, a sludge forms on the glass surface and remains there, except that after several minutes the layer is so thick and heavy as to be easily disturbed or dislodged. Uniform attack of the lime, soda and sand of the glass in accordance with the above equations would result in the depletion of 1.8 parts of $NH_4FHF$ for each part of HF. The ratio of H/F atoms of these two materials in stoichiometric or proportional depletion is .72.

Surprisingly, the rate of glass attack is not apparently hampered by the presence of a visible and growing sludge layer formed soon after a ground glass surface is immersed in the solution. However, the initial attack rate before the sludge becomes evident is higher than the subsequent constant rate, and it appears that the initial glass surface invites a different attack by the solution.

APPLICATION AND REMOVAL OF THE SOLUTION

The glass attack is controlled by timing the application and removal of the prescribed solution, and care is taken to avoid either limiting or accelerating the removal by chemical change due to depletion or dilution or by physical disturbance of the sludge during the glass attacking period.

Accordingly, the glass is either immersed in a solution bath or flooded to maintain more than a thin film of solution on the ground glass surface. In a minute's time, assuming uniform volume depletion, the relatively small depletion of 5% of the HF and $NH_4FHF$ would not be reached unless the layer of solution was only .02 inch thick, in accordance with the depletion equations stated above. For ease and uniformity of application by flooding, however, the solution is applied in surplus amounts sufficient to flow over the edges of the glass. Spraying the solution on the lower side of a horizontal glass surface leaves a sufficient layer exceeding that for the 1% depletion.

The timing of the attack period has been selected as advantageously in order of 30 to 60 seconds for installations where conventional rouge polishing follows the chemical prepolishing at conventional line speeds. As shown by Fig. 1, the removal in this period takes advantage of the high initial removal rate. Apart from any desirable economic balance in so limiting the reaction period, the glass removal is most dramatically evident during the initial clearing period of 30 to 60 seconds in visibly clearing the ground glass surface. Beyond this initial rapid clearing period the clarity improvement is less marked, and thus far has been found less advantageous from the standpoint of reliability and quality of ultimate polish.

While the shape of the curve for ground glass in Fig. 1 indicates the change of rate for glass which has been immersed different lengths of time, the removal at each time is the total removal starting at zero time of a fresh ground surface. A ground plate glass sample was weighed, immersed in a bath of fresh 110° F. solution of Example A, washed clean, and reweighed at each test point. The mechanism which causes the initial removal rate to be highest in not known, particularly in view of the fact that similar tests on rouge polished plate glass samples yielded the same results including the initially high weight removal during the first minute. It is worthy of note that the polished surfaces were ruined by immersion in the prepolishing solution which produced a frosted or patterned effect, while immersion in the same solution composition improved the ground surface, both in transparency and also in smoothness as measured by a profilometer. It must, of course, be remembered that the ground surface differs very markedly from the polished surface in physical characteristics such as greater total surface area and the presence of multitudinous sharp points and projections. These characteristics undoubtedly play a significant role during prepolishing in effectively reducing the amount of subsequent polish required rather than causing any particular patterned effect.

Conversion of the removed weight to the equivalent solid layer in Fig. 1 affords the convenient basis for comparing the glass removed with the smooth ground pit depth figure previously mentioned. Theoretically, the pit depth measurement represents an optimum amount to be removed by polishing from the ground surface by an ideal planing action which removes the high areas without lowering the low areas.

The selection of the initial clearing period as an optimum solution application time feasible on moving glass production lines is confirmed by successful prepolishing and polishing with large scale equipment for which both the polishing effort is reduced and a satisfactory overall quality of polish is achieved. The coincidence of clearing action and useful prepolishing is indicated so far as removal is concerned by weighing the glass removed for total rouge polishing on the one hand with that removed by prepolishing plus further rouge polishing. For this purpose, the pit depth test as previously described, in which a small glass area stationed under a rotary felt runner supplied with rouge is polished until the pits substantially disappear, affords a completed polish reference point. For periods within the practical prepolishing initial clearing period in such tests, the weight removal or equivalent solid layer in rouge polishing an unprepolished ground sample was approximately equal to the total of the weight removed (or equivalent solid layer) by first prepolishing a glass sample plus the further weight removed by rouge polishing the same prepolished area.

Coincident with timing of the attack period for producing the initial clearing action is the effective application and removal of the solution. Since the initial reaction rate appears to be quite high, as shown in Fig. 1, the glass is desirably wetted quickly over the area to be polished and splashing of droplets on dry areas is avoided. Removal of the solution brings with it the problem of removing the sludge. The glass is easily marred by localized pressures or scratching action possibly due to a differential chemical action on the freshly exposed surfaces. Likewise, very thin solutions on the glass may result in an uncontrolled glass attack.

Two approaches for removing the solution and sludge have been employed. One is to wash or sluice the sludge and solution off the glass with a stream of water which also cleans the glass. The water current helps to rapidly dilute the solution to a point where it is harmless to the glass. Another approach is by way of a mechanical wiping action such as provided by a soft or resilient wiping edge or squeegee, followed by a water wash to quickly dilute and remove any remaining solution film. Metal scraping or planing blades have not been found satisfactory and have left scratches or other marks.

FULL SCALE PRACTICE OF THE METHOD

The departure represented by the prepolishing method described is more fully appreciated by consideration of the simple and relatively inexpensive apparatus which may be employed for practice of the invention with realistic glass sizes and line speeds.

Fig. 2 illustrates prepolishing equipment for installation in the middle yards between the grinding and polishing sections of a single-side line. By way of example, the glass sheets 1 as cut for grinding and polishing may be approximately 15 feet long and 10 feet wide, and are conventionally each laid in a plaster bed and conveyed at a continuous rate under the grinding and polishing runners. The bottom or at least the edges of the glass, during the second-side prepolishing operation when the already polished first surface must be carefully protected, are sealed to the plaster or painted (such materials as "Tygon" paint have been employed).

The solution contact or dwell area is terminated by a transverse squeegee 3 extending across the line with the lower edge of the squeegee blade bearing against the glass. This squeegee serves to remove the solution and sludge as the glass is conveyed under it. A one-fourth inch thick gum rubber squeegee blade has been found satisfactory for this purpose. For better definition of the contact area, another transverse squeegee 4 is preferably above (or upstream) of the removal or exit squeegee in the event that the amount of solution applied to the glass is so large as to cause it to creep over the glass at a rate faster than its forward speed. Such an entrance squeegee, in addition to confining the applied solution, also serves as an additional means for wiping the glass clean and dry before it enters the solution contact area. With an exemplary solution dwell time of 30 seconds and at a representative line speed of 130 inches per minute, the squeegees are accordingly spaced 65 inches apart.

As further shown in Fig. 2 a solution supply pipe 5 extends across the glass, preferably no more than a few inches above it, and is provided with multiple supply openings for applying liquid quickly and thoroughly over the surface. The pipe is suitably made of stainless steel and is located just beyond the entrance 4 in the direction of glass travel, so that solution contact begins at the start of the 65 inch span of the glass as it travels under the entrance and exit squeegees. In an exemplary installation, with spray openings 7/64 in diameter located every inch along a one-inch inside diameter pipe, the liquid pressure was limited to less than two pounds per square inch to avoid potential damage to the ultimate surface by an overly hard spray or jet impact. A second spray tube 6 extending transversely across the glass just beyond the exit squeegee 3 on the glass travel sprays the wiped surface with water. This spray is intended to greatly dilute the solution film remaining on the glass instantaneously, and stop any further reaction. Additional washing hoses may be applied, but care should be taken to avoid splashing the wash water into the solution contact or dwell area between the squeegees.

In using the equipment on sheets of the size indicated and having the glass composition and ground surface previously defined, the solution of Example A and the wash water were preheated to approximately 100° F. The surplus applied solution was allowed to flow over the edges of the bed and beyond the ends of the exit squeegee into gutters to permit its collection and reclamation. Hoods over the treatment section of the line carry off the fumes.

The upper surfaces of the glass sheets so prepolished were then polished under rouge runners in a pre-existing conventional line normally having 25 polishing heads in use. By lifting the first 5 of the polishing heads approximately the same quality of polish for prepolished glass was obtained as for control sheets not prepolished and subjected to the full 25 polishing runners. The different areas of each were inspected and marked for cutting into various sizes of glazing to mirror quality glass. Control sheets which had not been prepolished and were subjected to the lesser number of runners were definitely "short," i.e., a large number of the defects from the grinding pits or fissures still remained to constitute a recognizable defect condition causing the glass to be rejected in part as cullet.

It will be appreciated that with the prepolished glass thus requiring less rouge polishing to produce the same quality polish as for glass which is not prepolished, an equivalent polish may also be secured by increasing the line speed and using all of the runners previously employed on the unprepolished glass. The exact increase in line speed will vary in different plants according to the balance between the grinding and polishing effort.

Figure 3 illustrates another type of apparatus suitable for simultaneous prepolishing of both ground sides of twin ground uncut glass ribbon. Such a glass ribbon may remain uncut for a twin polishing line or cut into sheets for single-side polishing lines. However, twin prepolishing is advantageously employed before the ribbon is cut since the solution can be applied to and removed from both sides at once without the problem of seepage from a wet side to a dry side. As may be seen in Figure 3 a continuous glass ribbon 8 enters a stationary solution tank 9 on the glass line. Pairs of pinch rolls (not shown) suitably support the glass ribbon before and after its passage through the tank. Respective pairs 10 and 11 of opposed upper and lower squeegees in the respective end walls of the tank define entry and exit wiping and solution-confining openings for the ribbon in its continuous travel. To prevent excessive sagging of the glass within the tank, its edges ride on horizontal flanges 12 on inside side walls of the tank. The flange may be suitably surfaced with rubber or other material which, when wetted by the solution, provides a reasonably low-friction guide surface.

The solution level in such a tank type apparatus is maintained high enough to cover the glass. A solution supply pipe 13 and drain 14 permit solution circulation and replenishing at a desired rate to avoid periodic flushing and renewal of the entire tank contents. The surfaces of the wiped glass emerging from the exit squeegee pair 11 are promptly washed.

With glass ribbon speeds normally running from 100 to 200 inches per minute the exemplary prepolishing time of 30 seconds sets a convenient tank length which is neither so short as to raise chemical handling problems associated with very high glass attacking rates nor so long as to render impractical the mechanical handling of the solution application area or support of the glass in that area.

For such installations where the line speed is relatively high and the prepolishing period is relatively long, transverse glass support means are desirable. Flooding tables, for example, in which a prepolishing solution is applied under pressure through apertures in the table surface may effectively float the glass.

PERMISSIBLE SOLUTION VARIATIONS

Successful plate glass prepolishing has not been completely predictable from small scale prepolishing tests nor has it been readily measurable from large full scale tests carried through to complete polishing. Thus, in large scale tests where a dilute solution of Example A was employed, the polish was marred by apparently random defective areas in which small holes, deeper than what would be expected of any remaining grinding pit bottoms, were observed and attributed to an uncontrolled drilling effect by the solution or by locally diluted solution due to splashing. These small holes were sufficient to render the glass unsatisfactory for critical applications such as high quality mirrors, although glazing quality was produced. However, unsuccessful clearing in terms of readily measurable and reproducible effects in small scale prepolishing tests does indicate unsuccessful or unprofitable ultimate polishing. The following information is accordingly offered for assistance in specifying apparatus installations and factory method tolerances and establishing trouble-shooting and quality control routines, as well as for further defining terms and the range of equivalents in practicing the invention.

Dilution may be first considered. Some dilution may occur by reason of water produced as a reaction product and the formulation of Example A is sufficiently concentrated to be effectively buffered against harmful effects by slight dilution. Briefly, for a range, as water is added the removal increases while the apparent clearing effect may improve. A plot of removal versus dilution does not show a single peak in this range. However, further dilution increases the removal with a further very apparent loss of beneficial prepolishing or clearing effect. Such dilute solutions are more than erratic; they are obviously unusable. A further increase in the amount of water to what might be termed as very dilute leads eventually to no removal as the active ingredients become negligible, but the amount of water is very great and a small removal is still deleterious rather than helpful.

Some appreciation of the scope of dilution involved in distinguishing the concentrated, the dilute and the very dilute solutions may be gained from the following table in which small scale tests and observable results are tabulated.

Table I.—Effect of dilution of Example A solution

| Example | Water Parts | Water Percent Total | Equivalent Micro Inches Removal | Profile Improvement | Remarks |
|---|---|---|---|---|---|
| A | 100 | 16 | 114 | +3.8 | Prepolished. |
| A-1 | 120 | 18.6 | 131 | +3.0 | Do. |
| A-2 | 150 | 22.2 | 181 | +2.3 | Do. |
| A-3 | 200 | 27.6 | 209 | +6.4 | Do. |
| A-4 | 300 | 36.4 | 242 | +6.7 | Do. |
| A-5 | 400 | 43.2 | 215 | +6.5 | Do. |
| A-6 | 464 | 47.0 | 227 | +2.5 | Prepolished, Slight Stain. |
| A-7 | 500 | 48.8 | 262 | −48 | Frosted; coarser than original smooth. |
| A-8 | 1,000 | 65.6 | 276 | −14 | Frosted; about as opaque as initial smooth. |
| A-9 | 1,070 | 67.1 | 347 | −10 | Do. |
| A-10 | 1,875 | 78.1 | 245 | −4.3 | Do. |
| A-11 | 3,750 | 87.9 | 200 | −3.0 | Do. |
| A-12 | 7,500 | 93.5 | 89 | −1.3 | Do. |
| A-13 | 15,000 | 96.7 | 77.3 | −0.7 | Do. |
| A-14 | 30,000 | 98.3 | 76 | −2.0 | Do. |

In the tests reported, it was found convenient to use test pieces of smooth ground glass (suitably 2 by 5 inches), and to dip the lower half of each strip for 30 seconds in a polyethylene beaker containing approximately 150 cc. of solution at approximately 100° F. The glass removed depletes the solution by a clearly negligible amount, i.e., less in these cases than 1% of the F. content. At the end of the timed period, the glass was removed and instantly washed off under a water tap.

The glass profile was measured with a Type Q, SLI Model 643 profilometer manufactured by Physicists Research Company. This is an instrument having a point which is drawn across the tested surface at a set velocity of about 20 inches per minute to provide a reading varying as the root-mean-square value of the rise and fall displacement of the point. While not directly reduced to pit depth measurements, the readings nevertheless offer a numerical comparison between the glass surface before and after the dip test. An undipped ground surface usually had readings in the range of 12.0 to 13.5 as compared with readings of a completely polished surface usually in the range of 0.6 to 1.1. The tabulated prepolishing improvement is that obtained by subtracting the average reading for the prepolished portion of the ground surface from that for the undipped portion. A positive figure indicates that the surface was less rough after prepolishing and a negative figure indicates that the ground surface had higher profilometer readings after dipping.

As may be noted from Table I, and also from the graphic protrayal of this data in Fig. 4, for dilute solutions the profilometer shows no positive difference. Obviously, such solutions offer no practical assistance. Before that point is reached, however, the profilometer difference passes through a positive peak as shown by solutions A-3 to A-4 and the cleared appearance of the glass is excellent. This peak represents, however, an unsafe condition in which unpredictable drilling may occur. Whether or not such drilling is occasioned by variations in the glass or its ground surface as presented for prepolishing, or local excessive accidental dilution of the solution, the risk has not justified the dilution of the Example A solution beyond the limits representing 20% additional water, or an overall water level of 18.6% by weight of the total solution, as shown by Example No. A-1 in Table I.

The formulation of Example A is one in which the amount of ammonium bifluoride is near the saturation point for the particular amount of hydrofluoric acid in the water. While saturation itself does not seem a meaningful requirement, the fact remains that the bifluoride is in near saturation amounts at conveniently maintainable temperatures. Significantly varying the HF and the NH₄FHF with respect to each other varies the clearing of the prepolished glass very noticeably. The data following is selected and condensed from many tests to indicate significant variations.

*Table II–A.—Relative variation of HF and NH₄FHF*

| Example | Solution, Parts by Weight | | | Molar Ratios | | Saturation Temperature, °F. |
|---|---|---|---|---|---|---|
| | HF | NH₄FHF | H₂O | H/F | F/H₂O | |
| B–1 | 100 | 375 | 100 | 0.64 | 3.27 | 130 |
| B–2 | 125 | 375 | 100 | 0.66 | 3.49 | 100 |
| B–3 | 135 | 375 | 100 | 0.67 | 3.56 | 90 |
| A | 150 | 375 | 100 | 0.68 | 3.72 | 80 |
| B–5 | 175 | 375 | 100 | 0.70 | 3.94 | <80 |
| B–6 | 215 | 375 | 100 | 0.72 | 4.30 | <80 |
| B–7 | 233 | 375 | 100 | 0.74 | 4.46 | <80 |
| C–1 | 0 | 167 | 100 | 0.50 | 1.05 | 140 |
| C–2 | 12.9 | 167 | 100 | 0.55 | 1.17 | 138 |
| C–3 | 29.0 | 167 | 100 | 0.60 | 1.31 | 122 |
| C–4 | 50.2 | 167 | 100 | 0.65 | 1.50 | 100 |
| C–5 | 65.6 | 167 | 100 | 0.68 | 1.64 | 80 |
| C–6 | 92.2 | 167 | 100 | 0.72 | 1.88 | <80 |
| C–7 | 118.4 | 167 | 100 | 0.75 | 2.12 | <80 |
| D–1 | 0 | 83.3 | 100 | 0.50 | 0.52 | 82 |
| D–2 | 6.4 | 83.3 | 100 | 0.55 | 0.58 | <80 |
| D–3 | 32.3 | 83.3 | 100 | 0.68 | 0.82 | <80 |
| D–4 | 66.7 | 83.3 | 100 | 0.77 | 1.13 | <80 |

*Table II–B.—Tests with examples of Table II–A*

| Example | Test Temperature, °F. | Equivalent Micro Inches Removal | Profile Improvement | Remarks |
|---|---|---|---|---|
| B–1 | 150 | 291 | +6.5 | Prepolished. |
| B–2 | 110 | 112 | +2.3 | Do. |
| B–3 | 110 | 124 | +3.2 | Do. |
| A | 110 | 114 | +3.8 | Do. |
| B–5 | 110 | 126 | +0.8 | Decreasing clarity and increasing surface roughness. |
| B–6 | 110 | 119 | +0.2 | Do. |
| B–7 | 110 | 111 | −0.2 | Do. |
| C–1 | 150 | 215 | +6.0 | Prepolished. |
| C–2 | 150 | 306 | +4.5 | Do. |
| C–3 | 150 | 439 | +6.1 | Do. |
| C–4 | 150 | 373 | +7.6 | Do. |
| C–5 | 150 | 228 | +3.5 | Do. |
| C–6 | 150 | 165 | +1.7 | Slight Prepolished Appearance. |
| C–7 | 150 | 166 | +1.5 | Do. |
| C–3 | 110 | 287 | +5.0 | Prepolished. |
| C–4 | 110 | 275 | +7.5 | Do. |
| C–5 | 110 | 160 | +2.0 | Slight Prepolished Appearance. |
| C–6 | 110 | 212 | −6.0 | Frosted and Opaque. |
| D–1 | 105 | 126 | −14 | Frosted, More Opaque than Initial Smooth. |
| D–2 | 110 | 316 | −3.5 | Slight Prepolished Appearance but Irregular. |
| D–3 | 110 | 212 | +6 | Prepolished. |
| D–4 | 110 | 356 | −28 | Irregularly frosted; Opaque. |

In Table II–A an H/F ratio has been calculated by summing separately the total acid H atoms and the total F atoms of the respective moles of HF and NH₄FHF. A likely ionic significance of this number may be appreciated from the observation that the H/F ratio for HF is 1.0 (one H and one F for each HF mole) and for NH₄FHF is 0.5 (one H and 2F for each mole—corresponding to the bifluoride ion HF₂⁻). Addition of the F/H₂O ratio completes the specification of the solutions of Table II–A.

Variation of the H/F ratio from 0.50 to 0.72, as confirmed by Table II–B, does not adversely affect the clearing of the ground glass surface.

Solubility of NH₄FHF becomes progressively more limited, however, as the H/F ratio is decreased in this range, and for the successful formulation and use of solutions containing NH₄FHF alone or NH₄FHF plus only a small amount of added acid, temperatures significantly above room temperature or the operating range of Example A must be employed. Thus, for solutions prepared with NH₄FHF and no added acid, a minimum of about 125 parts of NH₄FHF must be dissolved in 100 parts of water to produce a prepolishing solution. This corresponds to a saturation temperature of about 115° F., with the consequent necessity of preheating glass and solution-handling equipment to a safe margin above this minimum temperature. Use of added acid within the specified range improves solubility sufficiently that successful prepolishing can be accomplished at or slightly above room temperature.

No advantage is seen in reducing the H/F ratio below that obtainable with NH₄HF₂, i.e., below 0.50. Although this can be done with solutions prepared from appropriate mixtures of NH₄F and NH₄HF₂, such solutions are further limited in solubility and prepolishing action. Instead a convenient midrange H/F ratio of about two-thirds avoids most of the boundary limitations in the various polishing solutions.

Chemicals other than hydrofluoric acid and ammonium bifluoride may be added to water to make solutions equivalent to those previously discussed by following the H/F ratio guide. For example, ammonium fluoride (NH₄F) and hydrofluoric acid (HF) in water are well known equivalents to an ammonium bifluoride solution, where the moles of HF equal the moles of NH₄F. For such a solution, the H/F ratio is, of course, 0.5. Added amounts of HF beyond the bifluoride proportions of NH₄F and HF increase the H/F ratio.

Other acids or acid salts for supplying additional acid hydrogen atoms (i.e., the hydrogen ion) to an ammonium bifluoride solution may be employed within solubility limits. Thus, for example, part or all of the HF beyond that of a bifluoride solution may be replaced by common mineral acids such as nitric, phosphoric, sulfuric or hydrochloric acids.

Such a substitution, however, imposes further limits on the solution formulation. Thus, solubilities are much more limited with addition of hydrochloric acid, while phosphoric and nitric acid solutions must be appreciably more dilute than the solution of Example A to effect a prepolish. Furthermore, the maximum prepolish obtained with solutions prepared with nitric acid fell significantly short of that obtainable with the solution of Example A. For these reasons, no advantage has been found in such substitutions since the H/F ratio still must be adjusted without either excessive dilution or precipitate formation.

In such equivalent types of formulation, H₂SO₄ and NH₄FHF in an aqueous solution, for example, can be maintained in the following proportions at 110–115° F. to produce substantially the same results as the solution of Example A:

| | E. (Same Wt. NH₄HF₂/H₂O as Example A) | F. (Same No. of Moles of H and F per Wt. of Water as Example A) |
|---|---|---|
| H₂O | 100 | 100 |
| H₂SO₄ | 117 | 183 |
| NH₄FHF | 375 | 589 |

Substitution of an acid other than hydrofluoric acid in greater proportions to effect an equivalent of the bifluoride ion in an ammonium fluoride solution has not been useful. For example, a solution of 68 parts of H₂SO₄ and 76 parts of NH₄F in 100 parts of water provides an H/F ratio of 0.68, just as does Solution Example A, but this solution was saturated at about 120° F. and produced a frosting effect rather than a prepolishing action. This result is apparently obtained because the solution is too dilute in active hydrogen and fluoride species. It will be recognized, of course, that the use of NH₄F and sufficient H₂SO₄ to provide a ratio of H to F atoms of 0.68 is chemically equivalent to use of NH₄FHF, H₂SO₄, and either NH₄HSO₄ or (NH₄)₂SO₄ in certain proportions. The presence of additional ammonium and sulfate or bisulfate ions appreciably limits solubility and thus has been found to have a detrimental effect in the prepolishing effort, without any compensating advantage. Accordingly, the solution is most significantly described as one of ammonium bifluoride, rather than ammonium fluoride, which is desirably further acidified, preferably by hydrofluoric acid, but permissibly by other acids in equivalent amounts so far as the hydrogen ion is concerned.

No equivalent cations to replace the NH₄⁺ ion have been found. Neither potassium nor sodium bifluoride or fluoride, the most common of the soluble bifluorides or fluorides, are successful substitutes. The sodium salt is ruled out mainly because of low solubility and resultant overly dilute solutions. The potassium salt has been ruled out because of the very slow attack of the glass, probably due to a self-limiting action by reason of a potassium silicofluoride precipitate. For example, in a solution composed of 190 parts of KFHF in a 60% concentration of HF, only 28 micro inches equivalent solid layer removal was obtained in an immersion time of 30 seconds with no observable clearing effect.

This application is a continuation-in-part of my copending application, Serial No. 574,630, filed March 29, 1956, which is in turn a continuation-in-part of my abandoned applications, Serial No. 363,341, filed June 22, 1953, and Serial No. 299,048, filed July 8, 1952, all assigned to the assignee of the present invention.

I claim as my invention:

1. The method of polishing a ribbon of ground plate glass, which comprises, advancing the ribbon beneath and in wiping engagement with a pair of squeegees extending transversely of the path of travel and spaced apart along such path a distance sufficient that each point in the ribbon remains between such squeegees for an interval of the order of about thirty seconds, flooding the portion of the ribbon between the squeegees with a concentrated aqueous solution capable of being formulated by hydrofluoric acid and ammonium fluoride in respective amounts such that the ratio of the atoms of acid hydrogen to the atoms of fluorine is about 0.5 to 1.0, and flushing the surface of the ribbon with water as it emerges from beneath the second squeegee which it passes to clear the same of any remaining solution and thereafter rubbing said ribbon in the presence of a slurry of abrasive until the surface of said ribbon has been polished to at least glazing quality glass.

2. The method which comprises treating ground plate glass with a solution containing amounts of ammonium, acid hydrogen and fluorine sufficient to afford substantial concentration of ammonium bifluoride in said solution, and wherein the ratio of dissolved acid hydrogen to dissolved fluorine is from about 0.5 to 1.0; permitting said solution to remain in contact with the surface of said ground plate glass for a period sufficient to render said surface substantially transparent; removing the solution and reaction products of solution and glass from said surface; and thereafter rubbing the so-treated substantially transparent plate glass in the presence of a slurry of finely divided abrasive until said surface has been polished to at least commercial glazing quality.

3. The method of claim 2 wherein the amounts of dissolved acid hydrogen fluorine and ammonium are sufficient to afford a substantially saturated ammonium bifluoride solution.

4. The method of claim 2 wherein said solution and reaction products are removed from the surface of the glass by the steps of wiping and water washing, respectively.

5. The method of claim 2 wherein ammonium is afforded at least in part by dissolving ammonium fluoride in said solution.

6. The method of claim 2 wherein ammonium is afforded at least in part by dissolving ammonium bifluoride in said solution.

7. The method of rendering ground plate glass substantially transparent which comprises flooding the surface thereof with an aqueous solution containing substantial concentrations of dissolved acid hydrogen, fluorine and ammonium, wherein the ratio of dissolved acid hydrogen to dissolved fluorine is from 0.5 to about 1.0, thereafter removing from the surface of the glass said solution and the reaction products of said solution and said glass.

8. The method of claim 7 wherein the solution and reaction products thereof with said glass are removed from the surface of said glass by the consecutive steps of wiping and water washing.

9. A solution for rendering ground plate glass substantially transparent which comprises in aqueous solution amounts of dissolved acid hydrogen, fluorine and ammonium ion sufficient to afford substantial concentration of ammonium bifluoride and wherein the ratio of dissolved acid hydrogen atoms to dissolved fluorine atoms is from 0.5 to 1.0.

10. The solution of claim 9 to which a mineral acid has been added.

11. The solution of claim 9 wherein the solution is substantially saturated with ammonium bifluoride.

12. The solution of claim 11 to which a mineral acid has been added.

References Cited in the file of this patent

UNITED STATES PATENTS

| | | |
|---|---|---|
| 2,354,091 | Sharpe et al. | July 18, 1944 |
| 2,366,825 | Adams | Jan. 9, 1945 |
| 2,390,404 | Walker | Dec. 4, 1945 |